United States Patent [19]

van den Dool et al.

[11] Patent Number: 5,007,043
[45] Date of Patent: Apr. 9, 1991

[54] METHOD FOR TRANSMITTING, VIA A PLURALITY OF ASYNCHRONOUSLY TIME-DIVIDED TRANSMISSION CHANNELS, A FLOW OF DATA CELLS, THE STATE OF A COUNTER FOR EACH TRANSMISSION CHANNEL BEING KEPT UP TO DATE IN ACCORDANCE WITH THE NUMBER OF DATA CELLS PER UNIT OF TIME

[75] Inventors: Frans van den Dool, Leidschendam; Jacob C. van der Wal, Delft, both of Netherlands

[73] Assignee: Koninklijke PTT Nederland N.V., Groningen, Netherlands

[21] Appl. No.: 472,349

[22] Filed: Jan. 30, 1990

[30] Foreign Application Priority Data

Feb. 3, 1989 [NL] Netherlands ................ 8900269

[51] Int. Cl.$^5$ .............................................. H04J 3/16
[52] U.S. Cl. ...................................... 370/60; 370/94.1
[58] Field of Search .................. 370/94.1, 94.2, 94.3, 370/60, 60.1, 13

[56] References Cited

U.S. PATENT DOCUMENTS 4,769,811  9/1988  Eckberg, Jr. et al. ............... 370/60

FOREIGN PATENT DOCUMENTS

0275678A1  7/1988  European Pat. Off. .
0293314A1  11/1988  European Pat. Off. .
0293315A1  11/1988  European Pat. Off. .

OTHER PUBLICATIONS

International Switching Symposium 1987, IEEE, pp. 462–469.

Primary Examiner—Douglas W. Olms
Assistant Examiner—Una Kim
Attorney, Agent, or Firm—Frishauf, Holtz, Goodman & Woodward

[57] ABSTRACT

The flow of data cells through a transmission medium with a plurality of virtual, asynchronously time-divided transmission channels is protected against excessive crowding of data cells in any channel, or of any customer, by means of a counter for each channel and the recording of the time or arrival of data cells in each channel. The counter is advanced by a predetermined amount at the arrival of each data cell and in the same operation is decreased by a value which is a function of the length of time between the moment of arrival of that data cell and the moment of arrival of a preceding data cell with the same channel designation. The state of the counter is also compared with a threshold value which, if equalled or exceeded results in the data cell not being switched through a switch controlled by the comparison, while in other cases the data cell is let through to the downstream portion of the channel.

14 Claims, 1 Drawing Sheet

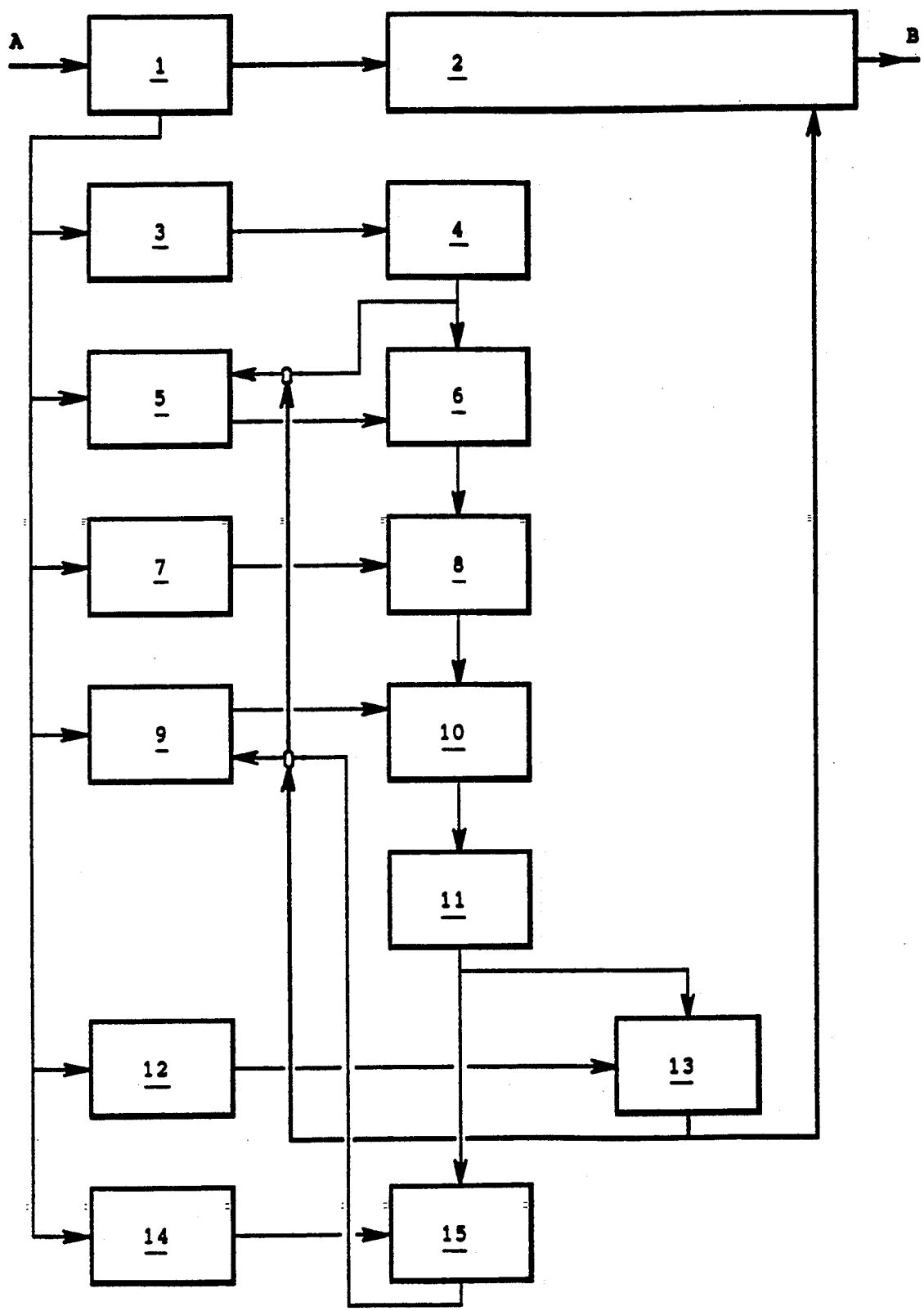

METHOD FOR TRANSMITTING, VIA A PLURALITY OF ASYNCHRONOUSLY TIME-DIVIDED TRANSMISSION CHANNELS, A FLOW OF DATA CELLS, THE STATE OF A COUNTER FOR EACH TRANSMISSION CHANNEL BEING KEPT UP TO DATE IN ACCORDANCE WITH THE NUMBER OF DATA CELLS PER UNIT OF TIME

BACKGROUND OF THE INVENTION

1. Field of the invention

The invention relates to a method for transmitting, via a transmission medium With a plurality of virtual, asynchronously time-divided transmission channels, a flow of data supplied to that transmission medium and consisting of data cells which are each transmitted via one of those transmission channels. Each of the data cells comprises a group of control words with one or more control words as well as a group of information words with one or more information words, the group of control words comprising a control word with a channel indication, indicating via which transmission channel the relevant data cell has to be transmitted, and the state of a counter being kept up to date for each transmission channel, which state has a certain fixed minimum value, and which is on the one hand decreased proportional to the time, and which is on the other hand increased proportional to the number of data cells with a channel indication, relating to said transmission channel. The state of the counter is compared with a threshold value when a data cell with a channel indication designating said transmission channel arrives at the beginning of the transmission medium at a certain moment of arrival, after which the data cell will be let through to the transmission medium located downstream, when the state of the counter is less than said threshold value, or it will not be let through to the transmission medium located downstream, when the state of the counter is more than or equal to said threshold value.

2. Problems

The above-mentioned, rather new method of data transmission—generally named ATM (=Asynchronous Transfer Mode)—which is particularly useful for wide band ISDN, is applied in quick packet switched networks, in which the information is contained in packets, called (data) cells, each consisting of one or more information words, and comprising not only those information words, but also a "header" with (inter alia) a control word indicating the transmission channel via which the cell has to be transmitted to its destination.

The transmission means and the switching means can have a capacity in the range of some Mbit/s up to many Gbit/s. The ATM-technique enables the network administrator to distribute the available capacity in an extremely flexible way.

A user could, however, try to supply a larger flow of cells to the network than the capacity allocated to him permits. Because of the flexibility of the ATM-technique this does not yet need to lead immediately to problems at the entrance of the network. An overload can, however, occur somewhere else on the route in the network due to which the traffic of other users could also be disturbed. In order to avoid such a situation it will be necessary to monitor the entrance, thus preventing the passage of cells of a certain user which exceed the capacity allocated to him. In reference (1) the monitoring of the entrance of ATM-networks is discussed by considering two concepts, which are both based on a method which is known under the name of "leaky bucket" method or "leaky integrator" method. According to this method the state of a counter is kept up to date (with a certain minimum value), which state is on the one hand decreased by a first constant value at set times and on the other hand increased by a second constant value whenever a data cell arrives. Subsequently the state of the counter is compared with a threshold value, after which the relevant data cell will be transmitted only if the state of the counter is less than that threshold value. Both the long-term average of the number of cells per unit of time as well as the number of cells which may be transmitted (during a short time) above that average (for example the number of cells which may be supplied immediately following one another) can be monitored by a mechanism of the aforesaid type. Only those data cells which do not exceed the maxima set will be transmitted.

In the aforesaid reference it is suggested to provide a "leaky bucket" device as described above for each network user (in other words, for each virtual transmission channel). The advantage of this is that each transmission channel will be monitored. A great practical problem is, however, that since the number of virtual transmission channels can be very large, e.g. $2^{16}$ (=65,536), the number of monitoring devices has to be equally large, which is very unattractive from a technical and commercial point of view.

In said reference it is also suggested to provide, for the whole group of network users (in other words, for the whole group of virtual transmission channels), a monitoring device as mentioned above for monitoring the joint users as a group. The advantage of this is that a much smaller number of monitoring devices has to be provided, but the disadvantage is that the various transmission channels cannot be monitored individually, which causes inter alia the problem that when the maximally allowed cell frequency is exceeded, it cannot be determined which of the various users is responsible for this, and consequently of which user the transmission of data cells has to be refused.

SUMMARY OF THE INVENTION

The invention provides a method for transmitting via a transmission medium with a plurality of virtual, asynchronously time-divided transmission channels a flow of data supplied to that transmission medium, and more in particular a method for protecting said transmission channels against an exceeding of the respective cell frequencies maximally allowed for said transmission channels, based on the "leaky bucket" entrance monitoring method, in which the aforesaid drawbacks of the methods hitherto suggested for this purpose are outweighed. According to the invention the state of the counter will be decreased on the arrival of a data cell by a value which is a function of the length of time between the moment of arrival of that data cell and the moment of arrival of a certain preceding data cell with the same channel indication.

The method according to the invention is first of all based on the understanding that the time-divided transmission of data cells also renders it possible to use a monitoring device protecting the transmission channels against an exceeding of the maximally allowed (average) cell frequency, in a time-divided way. Owing to this it will in principle be possible to monitor all the transmission channels individually by means of only one such a monitoring device. Moreover, the method according to the invention is based on the understanding that the state of the counter for each channel can be brought up to date in a time divided way only if the decrease of the state of the counter does not take place at set consecutive times (and always with a constant value) as according to the usual way of carrying out the "leaky bucket"-method, but only at those moments when a data cell arrives at the beginning of the transmission medium. According to the invention the state of the counter is not decreased by a constant value at those moments, but by a value which is a function of the time which has passed since the moment of arrival of a certain data cell preceding the aforesaid (arriving) data cell with an equal channel indication (which consequently makes use of the same transmission channel as the said last arrived data cell). So the decrease of the state of the counter takes place under the same time regime as the arrival of the data cells at the beginning of the transmission medium, which is in contrast with what was known so far. Also the increase of the state of the counter, the comparison of the state of the counter with a threshold value and the switching through or not, dependent on the result of the comparison, of data cells to the transmission medium located downstream, take place under that same time regime. Thus the monitoring device can function synchronously with the successively arriving data cells in a completely time-divided way, due to which all the virtual channels can be monitored by means of only that one monitoring device.

The value by which the state of the counter is decreased on the arrival of a data cell is preferably the product of a first constant value and the length of time between the moment of arrival of that data cell and the moment of arrival of a preceding data cell with the same channel indication.

In a further working-out of the invention a choice can be made from a number of options. For example, as said preceding data cell can be chosen the data cell which precedes the former data cell a number of N data cells arrived at the beginning of the transmission medium, or the data cell which precedes the former data cell a number of N data cells let through to the transmission medium located downstream. So in the first case all the data cells which have arrived are counted and in the second case only those data cells which had been let through, in which cases N preferably has the value 1, which implies that said preceding data cell is the last data cell which has arrived but one or the last data cell which has been let through but one, but if desired, N can have a greater value.

The state of the counter can, according to an embodiment, be increased by a second constant value preceding the comparison of the state of the counter with the threshold value, in which case after that comparison the state of the counter will be decreased again by that second constant value, if the state of the counter turned out to be more than the threshold value. So the second constant value will be subtracted again from the state of the counter, if the relevant data cell is not let through. According to a preferred embodiment, however, the state of the counter, after having been compared with the threshold value, will be increased by a second constant value only if on that comparison the state of the counter is less than the threshold value. Compared with the preceding embodiment the advantage achieved in this way is that the state of the counter will be increased only if the relevant data cell is let through; in the preceding embodiment the state of the counter was increased in all the cases, which increase was nullified again in case the data cell could not be let through, which takes more processing time than in the case of the embodiment just mentioned.

According to a further preferred embodiment of the invention the variables: the last state of the counter but one and the moment of arrival of said preceding data cell related to the relevant channel indication have been recorded and they will be read out under the control of said channel indication on the arrival of a data cell, and when the state of the counter has been brought up to date, said variables will moreover be replaced by the updated state of the counter and the moment of arrival of the last arrived data cell, on the understanding, however, that if the data cell is not let through (viz. in case the updated state of the counter is more than the threshold value), a choice can be made either not to replace the last state of the counter but one and the moment of arrival (in which case the last values but one remain unchanged) or to replace them; in that latter case the last state of the counter but one will be replaced by the state of the counter which is decreased in the above-mentioned way (the increase has either been nullified or not been carried out because of the fact that the data cell has not been let through—vide the preceding paragraph) and the last moment of arrival. If the maximally allowed average cell frequency, and the maximum spread in cell frequency of all the virtual transmission channels is the same, the first constant value, the second constant value and the threshold value can have been recorded as fixed parameters in the monitoring device. If it is, however, desirable to be able to set for each virtual transmission channel the maximum value for the average cell frequency and/or for the spread in cell frequency (which is preferably the case), said parameters or part of them will, according to a preferred embodiment of the invention, be recorded, related to the relevant channel indication, just like the variables mentioned hereinbefore, and they will be read out under the control of said channel indication on the arrival of a data cell. Preceding the putting into use of the relevant transmission channel the respective channel-specific parameter-values are recorded in the monitoring device. So with this preferred embodiment it is achieved that whenever a data cell arrives, the state of the counter of the virtual transmission channel indicated by the channel indication of that data cell will be brought up to date in conformity with the parameters recorded for that channel.

Since said parameters, the first constant value, the second constant value and the threshold value can be increased or decreased proportionally, whereas the working remains unchanged, they are preferably chosen in such a way that the first constant value is equal to 1 or to some other power of 2. If the first constant value is equal to 1, said product by which the state of the counter will be decreased on the arrival of a data cell will be equal to said length of time between the respective data cells, and a multiplication can in fact be dispensed with. If as a first constant value for the respective transmission channels different values are desirable, different powers of 2 will preferably always be chosen for these values, due to which said product can always be obtained in a simple way by means of bit shifting.

Besides the above-mentioned parameters also the resolution with which the respective moments of arrival of the data cells are registered can be set in conformity with the other parameters. Consequently, a low resolution will preferably be chosen for channels with a low maximally allowed cell frequency; in other words, the respective moments are registered with relatively large discrete time steps. Likewise a high resolution will preferably be chosen for channels with a high cell frequency allowed; because of that high frequency the respective moments are then measured and recorded in small discrete units of time.

The present invention provides not only the method indicated hereinabove, but also a device for carrying out that method. Such a device according to the invention comprises read-out means for reading out from the control word group of an arriving data cell the channel indication of that data cell, moreover storage means for reading out and storing under the control of said channel indication said variables and if desired, as indicated hereinabove, said parameters or part of them, time indicating means for determining the moment of arrival of a data cell, as the resolution with which this moment is determined, just like the parameters already mentioned, if desired, can have been read out from the storage means under the control of the channel indication, computing means for bringing up to date the state of the counter in said way by means of said variables and parameters, means of comparison for comparing the updated state of the counter with said threshold value after a data cell has arrived, and switching means for letting through that data cell, if the updated state of the counter is less than the threshold value and not letting through that data cell, if the state of the counter is more than or equal to said threshold value.

REFERENCES

[1] Kowalk, W.; Lehnert, R.
The "policing function" to control user access in ATM networks-definition and implementation. ISSLS 88: The International Symposium on Subscriber Loops and Services, Proc., IEEE, pp. 240-5, Sept. 1988.

BRIEF DESCRIPTION OF THE DRAWING

Figures

The single FIGURE shows a diagrammatic representation of an embodiment of a monitoring device according to the invention, in which the method according to the invention has been carried out.

DESCRIPTION

The monitoring device shown in FIG. 1 comprises a read-out device 1, a switching device 2, six storage devices 3, 5, 7, 9, 12, 14, a time-indicating device 4 and a processor, consisting of five computers 6, 8, 10, 11, 15 and a comparison device 13.

Data cells comprising a control word group and an information word group arrive one after the other at an input terminal A of the monitoring device where a readout device 1 is located, which derives the channel number from the control word group. The data cell itself is transmitted on to the switching device 2, where the data cell will be temporarily stored until a decision is made as to whether that data cell can or cannot be let through to an output terminal B of the switching device 2 to which a transmission network (not shown in the FIGURE) located downstream is connected.

An index is derived from the channel number and by means of that index the storage devices 3, 5, 7, 9, 12, 14 provide the parameters which are specific for the relevant channel. The first storage device 3 provides an indication of the resolution with which the time has to be determined by the time indicating device 4. The second storage device 5 provides an indication for the moment when the last data cell but one with the same channel number was let through to the network located downstream by the monitoring device. Subsequently it is determined by means of the first computer 6 how much time has passed between the last arrived data cell (moment t1) and the last data cell but one with the same channel indication (moment t2).

The second computer 8 multiplies the time passed ($\Delta t$) by a first constant value (C1) provided by the third storage device 7. If, however, the first constant value (C1) is chosen equal to 1, the third storage device 7 and the second computer 8 can be dispensed with. If as respective first constant values for the various channels only powers of 2 are taken, the multiplication can be carried out in a simple way as a bit shift in a shift register.

The value obtained in the aforesaid way is subtracted by the third computer 10 from a value (state of the counter) which is stored for the relevant channel number in the fourth storage device 9. The fourth computer 11 sees to it that the resulting value will not be less than a certain minimum value (e.g. 0).

The result obtained from the above is compared by the comparison device 13 with a threshold value provided by the fifth storage device 12.

If the comparison device comes to the conclusion that the result is smaller than the threshold value, the following actions will be carried out:

The switching device 2 receives an order to let the relevant data cell pass—via its output terminal B—to the transmission network located downstream.

The fifth computer 15 adds a second constant value provided by the sixth storage device 14 for the relevant channel number to the result obtained before from the fourth computer 11.

The result obtained from the fifth computer 15 is recorded in the fourth storage device 9, in which case the former value in this storage device 9 is overwritten.

The moment t1 determined before is recorded in the second storage device 5, in which case the former value in this storage device 5 is overwritten.

If the comparison device 13 comes to the conclusion that the result is greater than or equal to the threshold value, the following actions will be carried out:

The switching device 2 receives the order not to let the relevant data cell pass to the network located downstream. In many implementations of networks it is required in such a case that the place which has become vacant is replaced by a certain bit pattern, which indicates for example an empty data cell; this bit pattern will then be transmitted instead of the relevant data cell by the switching device 2 via its output terminal B.

In the simplest embodiment it is not necessary to record in the fourth storage device 9 (state of the counter) and in the second storage device 5 (moment t2); the values already recorded in the store are maintained.

At the initialization of the monitoring device respectively of a transmission channel the first storage device 3, the third storage device 7, the fifth storage device 12 and the sixth storage device 14 will be filled from the controlling device (not shown in the FIGURE) of the network with the parameters specific for the various channel numbers, just like the initial values (start values) for the variables in the second storage device 5 and in the fourth storage device 9. For that purpose said storage devices are provided with a setting means which gives the network control access to the storage means without interfering with the actual working of the monitoring circuit.

We claim:

1. A method for transmitting, via a transmission medium with a plurality of virtual, asynchronously time-divided transmission channels, a flow of data supplied to that transmission medium, and consisting of data cells which are each transmitted via one of those transmission channels, and each of which comprises a group of control words with one or more control words as well as a group of information words with one or more information words, the group of control words comprising a control word with a channel indication indicating via which transmission channel the relevant data cell has to be transmitted, and the state of a counter being kept up to date for each transmission channel, which state has a certain fixed minimum value, is decreased from time to time and is increased proportional to the number of data cells with a channel indication designating said transmission channel, which state of the counter is compared with a threshold value when a data cell with a channel indication designating said transmission channel arrives at the beginning of the transmission medium at a certain moment of arrival, after which the data cell is either let through to the transmission medium located downstream if the state of the counter is less than said threshold value or else not let through to the transmission medium located downstream, if the state of the counter is more than or equal to said threshold value, characterized in that the state of the counter is decreased on the arrival of said data cell by a value which is a function of the length of time between the moment of arrival of that data cell and the moment of arrival of a certain preceding data cell with the same channel indication.

2. A method in accordance with claim 1, characterized in that the value by which the state of the counter is decreased on the arrival of the data cell is the product of a first constant value and said length of time between the moment of arrival of that data cell and the moment of arrival of said preceding data cell With the same channel indication.

3. A method in accordance with claim 1, characterized in that said preceding data cell precedes the data cell mentioned first by a number of N data cells arrived at the beginning of the transmission medium.

4. A method in accordance with claim 1, characterized in that said preceding data cell precedes the data cell mentioned first by a number of N data cells previously let through to the transmission medium located downstream.

5. A method in accordance with claim 3, characterized in that said number of N is equal to 1.

6. A method in accordance with claim 1, characterized in that the state of the counter is increased by a second constant value, preceding the comparison of the state of the counter with the threshold value, and in that after that comparison the state of the counter will be decreased again by the second constant value, if on that comparison the state of the counter turned out to be more than the threshold value.

7. A method in accordance with claim 1, characterized in that the state of the counter will be increased by a second constant value after the state of the counter has been compared with the threshold value, notably only if on that comparison the state of the counter turned out to be less than the threshold value.

8. A method in accordance with claim 1, characterized in that the variables: the last state of the counter but one and the moment of arrival of said preceding data cell, related to the relevant channel indication of the respective transmission channels have been recorded, in that on the arrival of a data cell said variables will be read out under the control of said channel indication in the control word of that data cell, and in that said variables will be replaced by respectively the updated state of the counter and the moment of arrival of the data cell mentioned first, at least if the state of the counter is less than the threshold value.

9. A method in accordance with claim 8, characterized in that at least some the parameters: the first constant value, the second constant value, the threshold value and the time resolution with which the respective moments of arrival of the data cells are registered are predetermined and recorded in a manner related to the channel indication of the respective transmission channels, and in that on the arrival of a data cell these parameters are read out under the control of said channel indication in the control word of that data cell.

10. A method in accordance with claim 2, characterized in that the first constant value is equal to a power of 2.

11. A method in accordance with claim 10, characterized in that the first constant value is equal to 1.

12. A method in accordance with claim 9, characterized in that the first constant values of the respective transmission channels are powers of 2.

13. In a system for transmitting, by way of a transmission medium having a plurality of virtual, asychronously time-divided transmission channels, a flow of data supplied to that transmission medium and consisting of data cells which are each transmitted by way of one of those transmission channels, each data cell of which comprises a group of one or more control words as well as a group of one or more information words, the group of control words comprising a control word with a channel indication designating by which transmission channel the relevant data cell has to be transmitted, said system including a counter for each transmission channel, the combination of apparatus for controlling said flow of data, channel by channel to a downstream portion of said transmission medium, comprising:

read-out means (1) for reading out, from the control word group of an arriving data cell, its channel indication;

storage means (3, 5, 7, 9, 14) for storing and reading out the last states of said counters and the moments of arrival of said data cells last preceding an arriving data cell as related to said respective channel indications, as well as for storing first and second predetermined constant values and a predetermined threshold value;

time indicating means (4 for determining the moment of arrival of a data cell;

computing means (6, 8, 10, 11, 15) for bringing up to date said states of said counters by reference to data stored in said storage means and in so doing decrementing said counters by a quantity proportional to the time elapsed since the arrival of a preceding data cell in the same channel;

comparator means (13) for comparing the updated state of a said counter with said threshold value and having an output;

switching means (2) connected to both an upstream section and a downstream section of said transmission medium and having a control input connected to said output of said comparator means for letting through a data cell from an upstream section to a downstream section of said transmission medium in a channel thereof if the updated state of the relevant counter is less than said threshold value, and blocking that data cell from transmission to said downstream section of said medium if the state of the relevant counter is more than or equal to said threshold value.

14. The apparatus combination of claim 13, in a system wherein said predetermined values include a first constant value which is a power of two for each of said transmission channels, wherein said storage means includes means for storing measures of time resolution related to said respective channels and wherein said time indication means (4) has a connection to said storage means and is constituted for determining the moment of arrival of a data cell only with a time resolution measure stored in said storage means.

* * * * *

UNITED STATES PATENT AND TRADEMARK OFFICE
CERTIFICATE OF CORRECTION

PATENT NO. : 5,007,043
DATED : April 9, 1991
INVENTOR(S) : van den Dool et al

It is certified that error appears in the above-identified patent and that said Letters Patent is hereby corrected as shown below:

Column 8, Claim 8 (line 2), delete "the variables:".

Column 8, Claim 8 (line 2), change "last" to --penultimate--

Column 8, Claim 8 (lines 2-3), delete "but one".

Column 8, Claim 8 (line 5), change "have been" to --are--.

Column 8, Claim 9 (lines 7-8), change "channels" to --channel--.

Title page, Section [56] References Cited, change the classification of USP 4,769,811 from "370/60" to --376/60--.

Signed and Sealed this

Thirteenth Day of April, 1993

Attest:

STEPHEN G. KUNIN

*Attesting Officer*   Acting Commissioner of Patents and Trademarks